Dec. 31, 1929.   C. S. BRAGG ET AL   1,741,818
POWER ACTUATED BRAKE MECHANISM FOR AUTOMOTIVE VEHICLES
Filed April 21, 1927
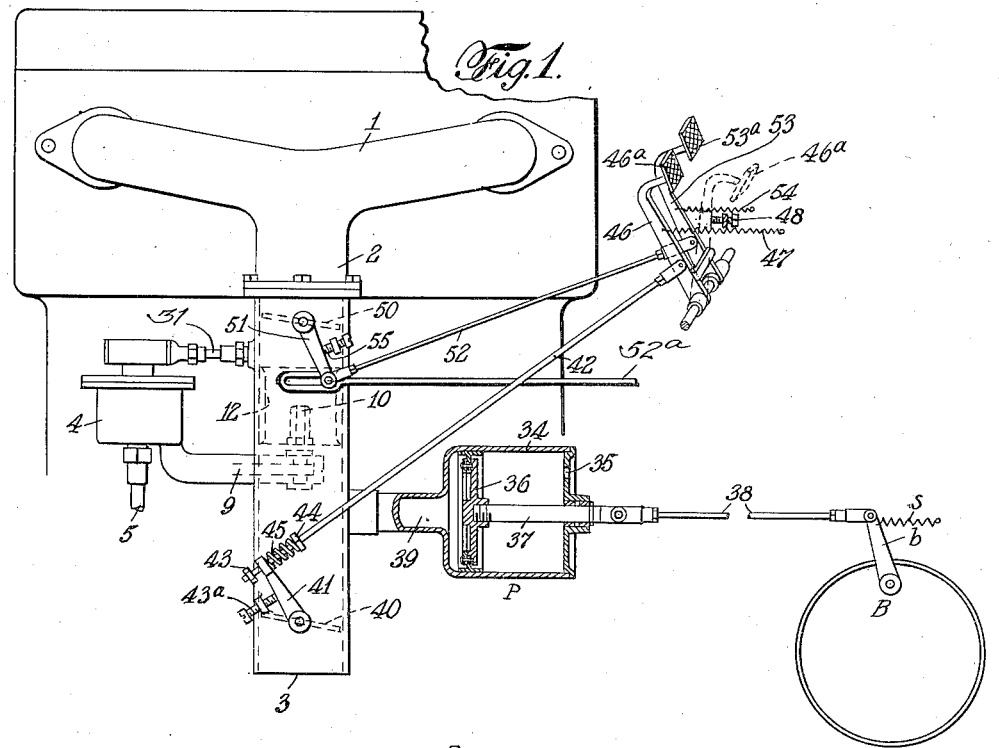
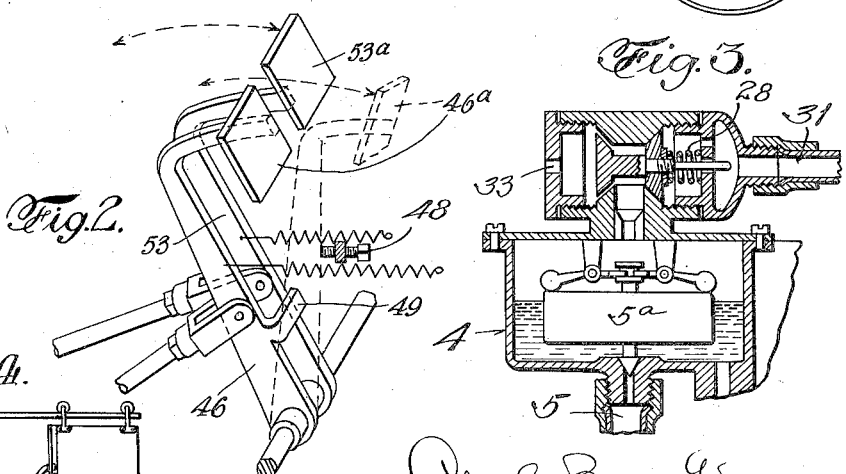

Patented Dec. 31, 1929

1,741,818

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

POWER-ACTUATED BRAKE MECHANISM FOR AUTOMOTIVE VEHICLES

Application filed April 21, 1927. Serial No. 185,470.

Our invention consists in the novel features hereinafter described, reference being had to the accompanying drawings, which illustrate one embodiment of our invention selected by us for purposes of illustration, and a slight modification thereof, and the said invention is fully disclosed in the following description and claims.

Our invention relates to power actuated mechanism for operating brake mechanism and other devices, (as the doors of buses, etc.) of automotive vehicles propelled by an internal combustion engine having a suction passage for supplying the normal explosive charges to the engine cylinders, and having an air inlet aperture for the admission of atmospheric air which forms the larger part of such explosive charges, and in which the rarification within the suction passage upon which the operation of a suction actuated power actuator connected with the brake mechanism of the vehicle depends, is rendered effective by shutting off to a greater or less extent the admission of atmospheric air to the suction passage of the engine, as by a valve located between the air inlet for the suction passage and the carburetor which injects liquid fuel into the stream of atmospheric air drawn into said passage, the suction actuated device being connected with the suction passage between said inlet controlling valve and the throttle valve by means of which the speed of the engine is regulated in the usual manner.

The object of our present invention is to provide means whereby the operator may, after closing the air inlet valve to effect the operation of the suction actuated device and the brake or other mechanism connected therewith, open the throttle valve to a greater or less extent, preferably by the same operator operated means, to hasten the production of a desired degree of rarification in the suction actuated device and the portion of the suction passage with which it is connected, to effect a quicker application of the brakes or other devices, if desired, and avoiding the necessity, which would otherwise exist, of withdrawing the air from the suction device past a closed throttle valve and eliminating, when desired, the time element which the presence of a closed throttle valve between the suction actuated device and the engine cylinders would otherwise impose.

In the accompanying drawing,

Fig. 1 is a diagrammatic view illustrating an installation in an automotive vehicle provided with an internal combustion engine for propelling the vehicle, and brake mechanism operated by a suction actuated device connected with the suction passage of the engine between the air inlet controlling valve and the throttle valve of the engine, and embodying our invention, the actuator being illustrated in section, and the operator operated parts for controlling the throttle valve and brake applying valve being shown in perspective for greater clearness.

Fig. 2 is an enlarged perspective view of the operator operated parts.

Fig. 3 is a detail sectional view showing the valves which serve to equalize pressure at the discharge nozzle and on top of the fuel in the float chamber of the carburetor.

Fig. 4 is a diagrammatic view showing an actuator operatively connected to a door of an automotive vehicle.

Referring to the drawing, it is to be understood that Fig. 1 represents more or less diagrammatically an installation of a power actuated brake mechanism embodying our invention in an automotive vehicle provided with an internal combustion engine. The entire engine is not shown, but is indicated in part by the intake manifold, 1, provided with a vertically disposed tubular portion, 2, constituting with the manifold, the suction passage of the engine. The tubular portion, 2, is provided at its lower end with an air inlet, 3, for the atmospheric air, which forms the larger portion of the explosive mixture for the engine. The suction passage is provided with a carburetor, and in the drawing, 4 represents the liquid fuel reservoir or float chamber provided with a fuel supply pipe, 5, which will ordinarily be controlled by the usual needle valve and float, indicated at 5ª or other means for maintaining a predetermined liquid level in the float chamber, and the carburetor is provided with a jet nozzle indicated in dotted lines at 10, communicating with the float chamber by tubular passage, 9. The portion, 2, of the suction passage is also provided preferably with the usual Venturi tube, indicated at 12. 50 represents the usual throttle valve, located in the vertical portion of the suction passage above the carburetor, and provided with an operating arm, 51, connected by a link, 52, to a foot lever, 53. A retracting spring, indicated for example at 54, and in this instance connected with the throttle control lever or accelerator pedal, is provided for normally holding the throttle valve closed, as is usual, and an adjustable stop, indicated in this instance at 55, and constructed to engage the arm, 51, is provided for limiting the closing movement of the throttle valve and determining its normal closed position, in which it provides for the passage thereby of a sufficient amount of explosive mixture to furnish the explosive charges for idling the engine.

In Fig. 1 we have presented diagrammatically at B, the brake mechanism of the vehicle, which may be of any desired type and may be applied to two or more wheels, as desired. In this instance, b, represents diagrammatically a lever by means of which the brakes, B, may be applied, and s, represents diagrammatically the yielding retracting means or springs for returning the brake mechanism to normal position. P represents the suction actuated power actuator comprising in this instance a cylinder, 34, open to atmosphere at one end, as indicated at 35, and provided with a piston, 36, the piston rod, 37, of which is shown connected by linkage, indicated at 38, with the brake mechanism, as the brake operating lever, b. The forward end of the actuator cylinder is shown connected by a suction pipe, 39, with the portion, 2, of the suction passage of the engine between the air inlet, 3, and the throttle valve, 50.

We have also shown the vertical portion, 2, of the suction passage adjacent to the air inlet, 3, provided with an air inlet controlling valve, 40, also preferably of the butterfly type, provided with an actuating arm, 41, connected with a link, 42, by means permitting lost motion between the link, 42, and the valve operating arm, 41. In this instance the outer end of the arm, 41, is provided with an aperture, through which the link or rod, 42, extends loosely. The link or rod, 42, is provided with a nut or stop, 43, on one side of the lever arm for engaging said arm, and with a stop collar, 44, on the other side of the lever arm 41, and a spring, 45, or other yielding device is arranged between the stop collar, 44, and the lever arm, 41, and normally holding the arm, 41, against the stop, 43. The lever arm, 41, is also arranged to engage with an adjustable stationary stop, 43ª, in the form of a set screw, for limiting the closing movement of the valve, 40.

The link or rod, 42, is connected with an operator operated part, in this instance a pedal lever, 46, provided with a retracting spring, 47, and a stop, 48, preferably adjustable, for limiting the movement of the lever under the action of the retracting spring, said stop being so positioned as to arrest the lever, 46, when the valve 40 is in open position. For convenience of reference, we term the lever, 46, the brake lever, and the lever, 53, the throttle lever. We prefer to pivot these levers co-axially side by side, as shown in Fig. 1, and the stops, 55 and 48, are so arranged that when the levers are in their normal positions to which they are returned by their respective retracting springs, the foot pedal, 46ª, of the lever, 46, will be retracted to the rear of the corresponding foot pedal, 53ª, of the throttle lever, 53, the normal position of the lever, 46, being indicated in dotted lines in Fig. 1, and the normal position of the lever, 53, being indicated in full lines in that figure. The said brake lever is preferably so connected and arranged that when it has moved the air inlet valve, 40, into a predetermined closed position it will also operate on the throttle valve, 50, in a direction to open it. This enables both valves to be operated by a single operator operated part, and may be accomplished in many ways. In the present instance we have shown the brake lever, 46, provided with a laterally extending arm or projection, 49, (see particularly Fig. 2), adapted to engage the throttle lever, (or accelerator) 53, so that the further movement of the brake lever, 46, will also effect a forward movement of the throttle lever. This will have the effect of opening more or less the throttle valve, 50, without producing any further effect on the valve, 40, as the further downward movement of the link or rod, 42, will be accommodated by the spring, 45, before described.

The operation of the parts hereinbefore described will be as follows. Assuming the engine to be running and it is desired to operate the suction actuated device connected with the intake manifold, as the power actuator, P, connected with the brake mechanism, as before described, the operator by placing his foot on the pedal, 46ª, and depressing the lever, 46, to a greater or less extent, may correspondingly move the valve, 40, toward its closed position, thereby shutting off the admission of air through the air inlet, 3, to the suction passage, and produce a supernormal degree of rarification within the vertical portion, 2, of the suction passage with which the suction pipe, 39, is connected, greatly in excess of the slight rarification which normally exists therein adjacent to the carburetor nozzle for supplying the desired quantity of fuel for the normal explosive charges of the engine. This effects the withdrawal of air from the actuator cylinder, 34, on the forward side of the piston, and said piston will be moved forwardly into the position shown in Fig. 1, and thereby will apply the brake mechanism of the vehicle with a degree of pressure varying with the extent to which the valve, 40, is moved toward its closed position. The brakes may be, therefore, applied by the operator to the desired extent and will be held as applied as long as the driver keeps his foot on the pedal without varying the opening of the valve. As soon as the pedal is released, the valve, 40, will be opened, connecting portion, 2, of the suction passage pipe and the cylinder forward of the piston with the atmosphere, reducing the degree of rarification within these parts to approximately atmospheric pressure, and approximately equalizing the pressures within the cylinder so that the brakes may be released and the brake mechanism of the actuator piston returned to normal position by the retracting means, as spring, s. These springs must be made of sufficient strength to overcome the slight degree of rarification which is created within the air inlet passage when the throttle valve is fully open and the motor running at high R. P. M's. As this degree of rarification rarely exceeds two or three inches of mercury, the retracting springs need be made a little stronger than ordinarily, and a slight loss in the power of the cylinder is easily offset by slightly increasing the size.

When the brake is applied, the throttle valve, 50, will normally be in a closed position, and the air will, therefore be withdrawn from the power actuator past the throttle valve. The time required to withdraw the air from the power actuator past a closed throttle valve to produce an application of the brake mechanism, is an appreciable factor, and may undesirably retard the application of the brakes, and this may at times be objectionable, especially in the larger types of trucks and buses which require a power actuator having a large cylinder. Where it is desirable to hasten the withdrawal of air from the power actuator and secure a quicker application of the brakes, the operator can apply his foot to the brake pedal, 46ª, and instantly close the air inlet valve, 40, and bring the projection, 49, in engagement with the throttle lever. By exerting a further pressure on the brake pedal, 46ª, to depress the brake lever and throttle lever simultaneously, the throttle valve will be opened while the air inlet valve, 40, remains closed, thus removing the throttle valve to a greater or less extent from the path of the air withdrawn from the power actuator, and facilitating such withdrawal, and effecting a quicker and practically instantaneous application of the brake mechanism. The more fully the throttle valve is opened after the brake valve, 40, is closed, the quicker will be the application of the brake mechanism. The opening of the throttle valve by the further depression of the brake lever after the brake applying valve is closed will also tend to increase the speed of the engine somewhat and assist in more quickly evacuating the actuator cylinder and applying the brakes, but this effect will only be momentary as the closed valve, 40, will hold the engine down to idling speed as long as it remains closed.

It will be understood that the stop, 46, which limits the closing movement of the air inlet valve, 40, will be so adjusted that when the valve, 40, is in its closed position and limited by this stop, it will permit a sufficient amount of air to pass into the suction passage to supply an idling mixture to the engine, and prevent the stalling of the engine. Where the type of carburetor provided with a float chamber is employed for instance as shown in Fig. 3, we prefer to provide the float chamber with means for normally connecting it with the atmosphere by a vent passage 33, and to provide also an equalizing passage indicated at 31, suitable valve mechanism being provided and held in position by a spring 28, to maintain the equalizing passage closed and the vent passage open under normal conditions, when the engine is running and the suction actuated device is not being operated, the construction being such that the valves will be shifted to close the vent passage and open the equalizing passage when a supernormal degree of rarification exists in the suction passage adjacent to the jet nozzle, to prevent "loading up" or stalling it by the operation of the suction actuated device. The specific construction of this equalizing passage and controlling valve mechanism are not part of this present invention and are not claimed herein, as they form the subject matter of another application for Letters Patent of the United States, filed by us on or about April 21, 1927, and given Serial No. 185,469.

It will be understood by reference to Fig. 1 that the brake applying valve, 40, has the effect of choking the air inlet to the suction passage and carburetor in substantially the same manner as the ordinary choke valve, and that it may be made to serve the purpose of a choke valve in starting the engine, if desired, as the car is always stationary when the engine is started, and the fact that the closing of the valve, 40, would also apply the brakes would not be objectionable. The arrangement of the valve controlling levers so that they may be simultaneously operated when the air inlet control lever has moved the air inlet valve to predetermined closed position, will also co-operate in starting the engine, as the throttle valve may be opened to a greater or less extent to facilitate the withdrawal of the air from the suction actuated device, and the production of the desired richer mixture for starting purposes, after which the throttle lever can be released and the brake applying lever released to provide the normal idling mixture for the engine. The ordinary choke valve can, therefore, be dispensed with, and its purpose served by the brake applying valve, 40.

In carrying our invention into effect in connection with an internal combustion engine provided with a choke valve such as 40, the suction pipe 39 for the suction actuated power actuator can be connected to the suction passage 2 between the choke valve 40 and the throttle valve 50, and the brake applying lever, 46, can be connected to the choke valve 40 in the same manner as indicated in Fig. 1, so that the first movement of the lever will close the choke valve, and a further movement of the lever will effect the opening of the throttle valve in the manner hereinbefore described.

It will be understood that the throttle valve may be operated independently of the brake lever, by the usual hand throttle connection (indicated at 52ª) or by the foot throttle lever, 53, or accelerator, as it is usually called, for the purpose of controlling the speed of the engine and vehicle in the usual manner, the throttle valve being entirely free to be operated for that purpose alone, except when the brake applying lever has been depressed to operate the brake applying valve and subsequently open the throttle valve to secure a quicker application of the brakes, at which time no acceleration of the engine will be desirable.

Our preferred construction in which a single operator operated device is made effective to close the brake applying valve and to open the throttle valve to insure a quicker operation of the actuator and a quicker application of the brakes when desired is particularly desirable as it permits, in case of emergency, of the instantaneous movement of the single operator operated part (as lever, 46, for example), to such extent as to close the brake applying valve and open the throttle valve in a single operation of the lever to instantly apply the brakes with maximum power, while at the same time the operator can vary the degree of pressure to be applied by the brakes both before and after the opening of the throttle valve so that a wide range of efficiency in the use of the brakes, is obtainable.

It will be readily understood that the piston rod of the power actuator can be connected with other mechanism than brake mechanism, which it is desired to operate by power. For example, by connecting it with mechanism of well known or preferred type for opening the door, or doors, of a bus, which are normally returned to closed position by retracting springs, the herein described apparatus would operate in exactly the same manner to open the door, hold it in open position, and permit it to return to closed position, as has been described in regard to its operation in applying, holding, and permitting the release of the brake mechanism of the vehicle, and while we have claimed our invention specifically in connection with brake mechanism, we desire it to be understood that it may be employed for other purposes.

For example we have shown an actuator indicated at P′ having its piston rod 138 connected to an operating lever 160 pivotally mounted on a stationary part of the vehicle indicated at 161, one end of said lever having a sliding connection with a sliding door D of the vehicle, and said lever being provided with a retracting spring 162 for returning the door to closed position and the actuator piston to off or released position.

What we claim and desire to secure by Letters Patent is:—

1. In an automotive vehicle provided with brake mechanism, the combination with an internal combustion engine having a suction passage provided with an air inlet for supplying the air for the explosive mixture, a carburetor for fuelizing said air, and a throttle valve for said suction passage interposed between said carburetor and the engine cylinders, of a suction actuated device comprising a cylinder and piston, connections from said piston to the brake mechanism, a tubular suction connection from the said cylinder connected with said suction passage between the throttle valve and said air inlet, a normally open brake valve for said air inlet, for closing off the admission of air therethrough to effect the operation of the brake mechanism by said suction operated device, an operator operated part connected with said brake valve, and means for enabling the operator by continued movement of the operator operated part, to open the throttle valve after said inlet valve has been moved to a predetermined closed position, to expedite the withdrawal of air from the cylinder of the suction actuated device and the application of the brake mechanism at maximum power.

2. In an automotive vehicle provided with brake mechanism, the combination with an internal combustion engine having a suction passage provided with an air inlet for supplying the air for the explosive mixture, a carburetor for fuelizing said air, and a throttle valve for said suction passage interposed between said carburetor and the engine cylinder, of a suction actuated device comprising a cylinder and piston, connections from said piston to the brake mechanism, a tubular suction connection from the said cylinder connected with said suction passage between the throttle valve and said air inlet, a normally open brake valve for said air inlet, for closing off the admission of air therethrough to effect the operation of the brake mechanism by said suction operated device, a single operator operated part, and operative connections for effecting the closing of the brake valve and the opening of the throttle valve after the brake valve has been moved to substantially closed position, to expedite the exhaustion of the cylinder of the suction actuated device and the application of the brake mechanism at maximum power.

3. In an automotive vehicle provided with brake mechanism, the combination with an internal combustion engine having a suction passage provided with an air inlet for supplying the air for the explosive mixture, a carburetor for fuelizing said air, and a throttle valve for said suction passage interposed between said carburetor and the engine cylinder, of a suction actuated device comprising a cylinder and piston, connections from said piston to the brake mechanism, a tubular suction connection from the said cylinder connected with said suction passage between the throttle valve and said air inlet, a normally open brake valve for said air inlet, for closing off the admission of air therethrough to effect the operation of the brake mechanism by said suction operated device, an operator operated part connected with said brake valve, and means brought into operation when said operator operated part has been moved to substanatially close said brake valve, for effecting the opening of the throttle valve by a further movement of the operator operated part to expedite the application of the brake mechanism at maximum power.

4. In an automotive vehicle provided with brake mechanism, the combination with an internal combustion engine having a suction passage provided with an air inlet for supplying the air for the explosive mixture, a carburetor for fuelizing said air, and a throttle valve for said suction passage interposed between said carburetor and the engine cylinders, of a suction actuated device comprising a cylinder and piston, connections from said piston to the brake mechanism, a tubular suction connection from the said cylinder connected with said suction passage between the throttle valve and said air inlet, a normally open brake valve for said air inlet, for closing off the admission of air therethrough to effect the operation of the brake mechanism by said suction operated device, an operator operated part connected with said brake valve, by means providing lost motion, means for arresting said brake valve in a predetermined closed position, and means connected with said operator operated part for opening the throttle valve by a further movement of said part, to expedite the withdrawal of air from the cylinder of the suction actuated device and the application of the brake mechanism at maximum power.

5. In an automotive vehicle provided with brake mechanism, the combination with an internal combustion engine having a suction passage provided with an air inlet for supplying the air for the explosive mixture, a carburetor for fuelizing said air, and a throttle valve for said suction passage interposed between said carburetor and the engine cylinders, of a suction actuated device comprising a cylinder and piston, connections from said piston to the brake mechanism, a tubular suction connection from the said cylinder connected with said suction passage between the throttle valve and said air inlet, a normally open brake valve for said air inlet, for closing off the admission of air therethrough to effect the operation of the brake mechanism by said suction operated device, an operator operated part connected with said brake valve, means for independently operating the throttle valve, and operative connections between said means and said operator operated part for opening the throttle valve when the brake valve has been moved to a predetermined closed position, to expedite the withdrawal of air from the cylinder of the suction actuated device and the application of the brake mechanism at maximum power.

6. In an automotive vehicle provided with brake mechanism, the combination with an internal combustion engine having a suction passage provided with an air inlet for supplying the air for the explosive mixture, a carburetor for fuelizing said air, and a throttle valve for said suction passage interposed between said carburetor and the engine cylinders, of a suction actuated device comprising a cylinder and piston, connections from said piston to the brake mechanism, a tubular suction connection from the said cylinder connected with said suction passage between said inlet and the carburetor, a normally open brake valve for said air inlet for effecting the operation of said suction operated device, an operator operated part for said air inlet valve, and connections between said part and the brake valve and throttle valve constructed to effect the closing of the brake valve and the opening of the throttle valve after the brake valve is substantially closed, to expedite the withdrawal of air from the cylinder of the suction actuated device and the application of the brake mechanism at miximum power, the air withdrawn from the actuator being fuelized by the carburetor.

7. In an automotive vehicle provided with brake mechanism, the combination with an internal combustion engine having a suction passage provided with an air inlet for supplying the air for the explosive mixture, a carburetor for fuelizing said air, and a throttle valve for said suction passage interposed between said carburetor and the engine cylinders for controlling carbureted air to said engine, of a suction actuated device comprising a cylinder and piston, connections from said piston to the brake mechanism, a tubular suction connection from the said cylinder connected wth said suction passage between said inlet and the carburetor, a normally open brake valve for uncarbureted air entering said inlet for effecting the operation of said suction operated device, an operator operated part connected with the brake valve, means for opening the throttle valve after the brake valve has been moved to substantially closed position, to accelerate the engine and expedite the exhaustion of air within the cylinder of the suction actuated device and the application of the brake mechanism at maximum power.

8. In an automotive vehicle provided with brake mechanism, the combination with an internal combustion engine, having a suction passage provided with an air inlet, a throttle valve for said passage, and yielding means for holding it normally in closed position, a carburetor for said passage, a brake valve for said passage, and means for holding it normally in open position, of a suction actuated device comprising a cylinder and piston, means for connecting said piston with brake mechanism for the vehicle, a tubular connection from said cylinder communicating with the suction passage between said valves, an operator operated part, connections therefrom to the brake valve for effecting the closing of said valve, and a part connected with said operator operated part for opening the throttle valve when the said part has been moved to effect the closing of the brake valve.

9. In an automotive vehicle provided with brake mechanism, the combination with an internal combustion engine, having a suction passage provided with an air inlet, a throttle valve for said passage, and yielding means for holding it normally in closed position, a carburetor for said passage, a brake valve for said passage, and means for holding it normally in open position, of a suction actuated device comprising a cylinder and piston, means for connecting said piston with brake mechanism for the vehicle, a tubular connection from said cylinder communicating with the suction passage between said valves, an operator operated part, connections therefrom to said brake valve including a yielding part, means for arresting the brake valve in closed position, and means connected with said operator operated part for opening the throttle valve when said brake valve has been moved to substantially closed position.

10. In an automotive vehicle provided with brake mechanism, the combination with an internal combustion engine having a suction passage provided with an air inlet for supplying the air for the explosive mixture, a carburetor for fuelizing said air, and a throttle valve for said suction passage interposed between said carburetor and the engine cylinders, of a suction actuated device comprising a cylinder and piston, connections from said piston to the brake mechanism, a tubular suction connection from the said cylinder connected with said suction passage between the throttle valve and said air inlet, a normally open brake valve for said air inlet, for closing off the admission of air therethrough to effect the operation of the brake mechanism by said suction operated device, means for arresting the brake valve in predetermined closed position, an operator operated part, connections from said operator operated part to the brake valve including a spring adapted to yield when the brake valve is arrested in said predetermined closed position, an independent operator operated part, connections therefrom to the throttle valve for opening the throttle valve, said operator operated parts being pivoted substantially co-axially, and yielding means for normally holding the throttle valve in closed position and said independent operator operated part in alignment with the position of the first mentioned operator operated part when the brake valve is closed, whereby said operator operated parts may be moved together after the closing of the brake valve to open the throttle valve without imparting further movement to the brake valve, to expedite the exhaustion of the actuator cylinder and the application of the brake mechanism.

11. In an automotive vehicle provided with brake mechanism, the combination with an internal combustion engine having a suction passage provided with an air inlet for supplying the air for the explosive mixture, a carburetor for fuelizing said air, and a throttle valve for said suction passage interposed between said carburetor and the engine cylinders, of a suction actuated device comprising a cylinder and piston, connections from said piston to the brake mechanism, a tubular suction connection from the said cylinder connected with said suction passage between the throttle valve and said air inlet, a normally open brake valve for said air inlet, for closing off the admission of air therethrough to effect the operation of the brake mechanism by said suction operated device, means for arresting the brake valve in predetermined closed position, an operator operated part, connections from said operator operated parts to the brake valve including a spring adapted to yield when the brake valve is arrested in said predetermined closed position, an independent operator operated part, connections therefrom to the throttle valve for opening the throttle valve, yielding means for holding the throttle valve normally in closed position, said first mentioned operator operated part having a part for engaging the second mentioned operator operated part to effect the opening of the throttle valve by further movement of said first mentioned operator operated part after the brake valve is closed, to expedite the exhaustion of the actuator cylinder and the application of the brake mechanism.

12. In an automotive vehicle, the combination with an internal combustion engine having a suction passage provided with an air inlet for supplying the air for the explosive mixture, a carburetor for fuelizing said air, and a throttle valve for said suction passage interposed between said carburetor and the engine cylinders, of a suction actuated device comprising a cylinder and piston, connections from said piston to a part to be operated, a tubular suction connection from said cylinder, connected to the suction passage between the throttle valve and said air inlet, a normally open inlet valve for said air inlet, adapted to be moved into position to close off the admission of air therethrough, to effect the movement of the piston of said suction actuated device in one direction, and operator operated part connected with said inlet valve, and means for enabling the operator by continued movement of the operator operated part, to open the throttle valve after said inlet valve has been moved to a predetermined closed position, to expedite the withdrawal of air from the cylinder of the suction actuated device.

13. In an automotive vehicle, the combination with an internal combustion engine having a suction passage provided with an air inlet for supplying the air for the explosive mixture, a carburetor for fuelizing said air, and a throttle valve for said suction passage interposed between said carburetor and the engine cylinders, of a suction actuated device comprising a cylinder and piston, connections from said piston, to a part to be operated, a tubular suction connection from said cylinder, connected to the suction passage between the throttle valve and said air inlet, a normally open inlet valve for said air inlet, adapted to be moved into position to close off the admission of air therethrough, to effect the movement of the piston of said suction actuated device in one direction, an operator operated part connected with said inlet valve, means for limiting the closing movement of the inlet valve to prevent stalling the engine and terminating the suction of the engine pistons on which the operation of the suction actuated device depends, and connections from the operator operated part to the throttle valve for enabling the operator to open the throttle valve after the inlet valve has been arrested in its predetermined closed position to expedite the withdrawal of air from the cylinder of the suction actuated device.

14. In an automotive vehicle, the combination with an internal combustion engine having a suction passage provided with an air inlet for supplying the air for the explosive mixture, a carburetor for fuelizing said air, and a throttle valve for said suction passage interposed between said carburetor and the engine cylinders, of a suction actuated device comprising a cylinder and piston, connections from said piston to a part to be operated, a tubular suction connection from said cylinder, connected to the suction passage between the throttle valve and said air inlet, a normally open inlet valve for said air inlet, interposed between the union of said tubular connection with the suction passage and the atmosphere, when the said inlet valve is in closed position, and adapted to be moved into closed position to effect the movement of the piston of the suction actuated device in one direction, an operator operated part connected with said inlet valve, and means for enabling the operator by continued movement of the operator operated part to open the throttle valve after the said inlet valve has been moved to a predetermined closed position, to expedite the withdrawal of air from the cylinder of the suction actuated device.

15. In a servo-motor system the combination with the suction passage of an internal combustion engine and a carburetor for fuelizing the air passing through said suction passage, a throttle valve interposed between said carburetor and the engine cylinders and means for operating said throttle valve to control carbureted air to said engine, of an independent valve spaced from said throttle valve and arranged to control uncarbureted air entering said suction passage independently of the throttle valve, a suction operated servo-motor connected to said suction passage between said valves, and means for operating said valves in sequence to substantially close said air inlet to the suction passage and then expedite the rarification produced in said servo-motor.

16. In a servo-motor system the combination with the suction passage of an internal combustion engine and a carburetor for fuelizing the air passing through said suction passage, a throttle valve interposed between said carburetor and the engine cylinders and means for operating said throttle valve, of a choke valve arranged to control the entrance of air into said suction passage, a suction operated servo-motor connected to said suction passage between said valves, and a common operating means for said valves which is independent of the aforesaid throttle valve operating means and which is constructed and arranged to first close the choke valve and then open the throttle valve whereby the rarification in the servo-motor is expedited.

17. In a servo-motor system the combination with the suction passage of an internal combustion engine and a carburetor for fuelizing the air passing through said suction passage, a throttle valve interposed between said carburetor and the engine cylinders, and means for operating said throttle valve, of a valve spaced from said throttle valve and arranged to control the air entering said suction passage independently of the throttle valve, a suction operated servo-motor connected to said suction passage between said valves, operating means for said second mentioned valve, and an interlocking connection between the operating means of said valves which acts to open the throttle valve after the second mentioned valve has been operated to substantially close said air inlet to the suction passage.

18. In a servo-motor system the combination with the suction passage of an internal combustion engine and a carburetor for fuelizing the air passing through said suction passage, a throttle valve interposed between said carburetor and the engine cylinders and means for operating said throttle valve, of a valve spaced from said throttle valve and arranged to control the air entering said suction passage independently of the throttle valve, a suction operated servo-motor connected to said suction passage between said valves, and a common operating means for said valves arranged to operate the throttle valve independently of the aforesaid throttle operating means.

19. The combination with a suction passage of an internal combustion engine, a throttle valve for controlling the explosive mixture therethrough, and means for operating the throttle valve, of a suction actuated device having a constantly open connection with said suction passage, a brake valve in the suction passage, and means acting to operate the brake and throttle valves to close the former and open the latter successively.

20. The combination with a suction passage of an internal combustion engine, a throttle valve for controlling the explosive mixture therethrough, and means for operating the throttle valve, of a suction actuated device having a constantly open connection with said suction passage, a brake valve in the suction passage, and means acting to operate the brake and throttle valves to close the former and open the latter successively, together with a carburetor arranged to discharge its fuel in the suction passage between said valves.

21. The combination with the suction passage of an internal combustion engine, a throttle valve for controlling explosive mixture passing therethrough, a brake valve in said suction passage, a suction actuated device constantly connected to said passage between said valves, means for successively operating the brake and throttle valves to close the former and open the latter, and vice versa, and means for independently operating the throttle valve.

22. The combination with the suction passage of an internal combustion engine, a throttle valve for controlling explosive mixture passing therethrough, a brake valve in said suction passage, a suction actuated device constantly connected to said passage between said valves, means for successively operating the brake and throttle valves to close the former and open the latter, and vice versa, and means for independently operating the throttle valve, together with a carburetor constructed to deliver its charge of fuel to said passage between the valves.

In testimony whereof we affix our signatures.

CALEB S. BRAGG.
VICTOR W. KLIESRATH.